(12) United States Patent
Geswender et al.

(10) Patent No.: US 10,436,574 B2
(45) Date of Patent: Oct. 8, 2019

(54) OPTICAL NAVIGATION SYSTEM

(71) Applicant: Raytheon Company, Waltham, MA (US)

(72) Inventors: Chris E. Geswender, Green Valley, AZ (US); David G. Garrett, Tucson, AZ (US); William L. Chapman, Oro Valley, AZ (US); James N. Head, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1109 days.

(21) Appl. No.: 14/698,631

(22) Filed: Apr. 28, 2015

(65) Prior Publication Data

US 2016/0320174 A1    Nov. 3, 2016

(51) Int. Cl.
*G01B 11/26* (2006.01)
*G01B 11/00* (2006.01)
*G01S 1/70* (2006.01)

(52) U.S. Cl.
CPC ............... *G01B 11/00* (2013.01); *G01S 1/70* (2013.01)

(58) Field of Classification Search
CPC .................................. G01B 11/00; G01S 1/70
See application file for complete search history.

(56) References Cited

U.S. PATENT DOCUMENTS

| | | | |
|---|---|---|---|
| 3,817,620 A | 6/1974 | Suzaki et al. | |
| 5,461,473 A * | 10/1995 | Pratt | G01C 15/002 250/206.1 |
| 6,304,354 B2 | 10/2001 | Carlson | |
| 6,778,886 B2 | 8/2004 | Hunt | |
| 7,593,641 B2 | 9/2009 | Tegge, Jr. | |
| 7,925,167 B1 * | 4/2011 | Kozubal | H04B 10/118 398/118 |
| 2002/0032526 A1 * | 3/2002 | Diggelen | G01S 19/06 701/469 |
| 2002/0167702 A1 * | 11/2002 | Badesha | B64B 1/50 398/121 |
| 2007/0038374 A1 | 2/2007 | Belenkii et al. | |
| 2007/0254676 A1 * | 11/2007 | Pedigo | G01S 19/05 455/456.6 |
| 2008/0244920 A1 * | 10/2008 | Stegmaier | E02F 3/847 33/285 |
| 2009/0177398 A1 | 7/2009 | Belenkii et al. | |

(Continued)

FOREIGN PATENT DOCUMENTS

| CN | 103234552 A | 8/2013 |
|---|---|---|
| CN | 103744097 A | 4/2014 |

(Continued)

OTHER PUBLICATIONS

Kaplan, "New Technology for Celestial Navigation", Proceedings, Nautical Almanac Office Sesquicentennial Symposium, Mar. 3-4, 1999, pp. 239-254, US Naval Observatory, Washington DC.

(Continued)

*Primary Examiner* — Samantha K Abraham

(57) ABSTRACT

Technology for facilitating position determination is disclosed. A satellite with a known location can activate a light source on the satellite operable to emit light. The satellite can emit the light for a defined period of time to enable a receiver to detect the light and determine a geographical location using the light emitted from the satellite.

31 Claims, 6 Drawing Sheets

(56) References Cited

U.S. PATENT DOCUMENTS

2014/0062774 A1* 3/2014 Hale ................. G01S 19/48
342/357.31
2016/0363649 A1* 12/2016 Korevaar ................ G01S 1/70

FOREIGN PATENT DOCUMENTS

EP      2680024 A2     1/2014
WO  WO 2011/064332 A1  6/2011

OTHER PUBLICATIONS

Brown et al, "Long Duration Strapdown Stellar-Inertial Navigation Using Satellite Tracking", Position Location and Navigation Symposium, 1992, pp. 194-201, IEEE Plans, Monterey, California.

* cited by examiner

OPTICAL NAVIGATION SYSTEM

BACKGROUND

Each satellite that orbits the Earth can have a distinct ephemeris. The ephemeris can include various types of information, such as the position or orbit of the satellite on a number of dates and times in a regular sequence. Some satellites can use their orbit information for various applications. For example, a satellite's orbit information can be used for altimeter and imaging system applications. In one example, a satellite in a global positioning system (GPS) can use its orbit information to provide location and time information anywhere on or near the Earth, where a GPS receiver has an unobstructed line of sight to the GPS satellite. Satellite navigation systems, such as GPS, enable a receiver to determine a location from ranging signals received from a plurality of satellites.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
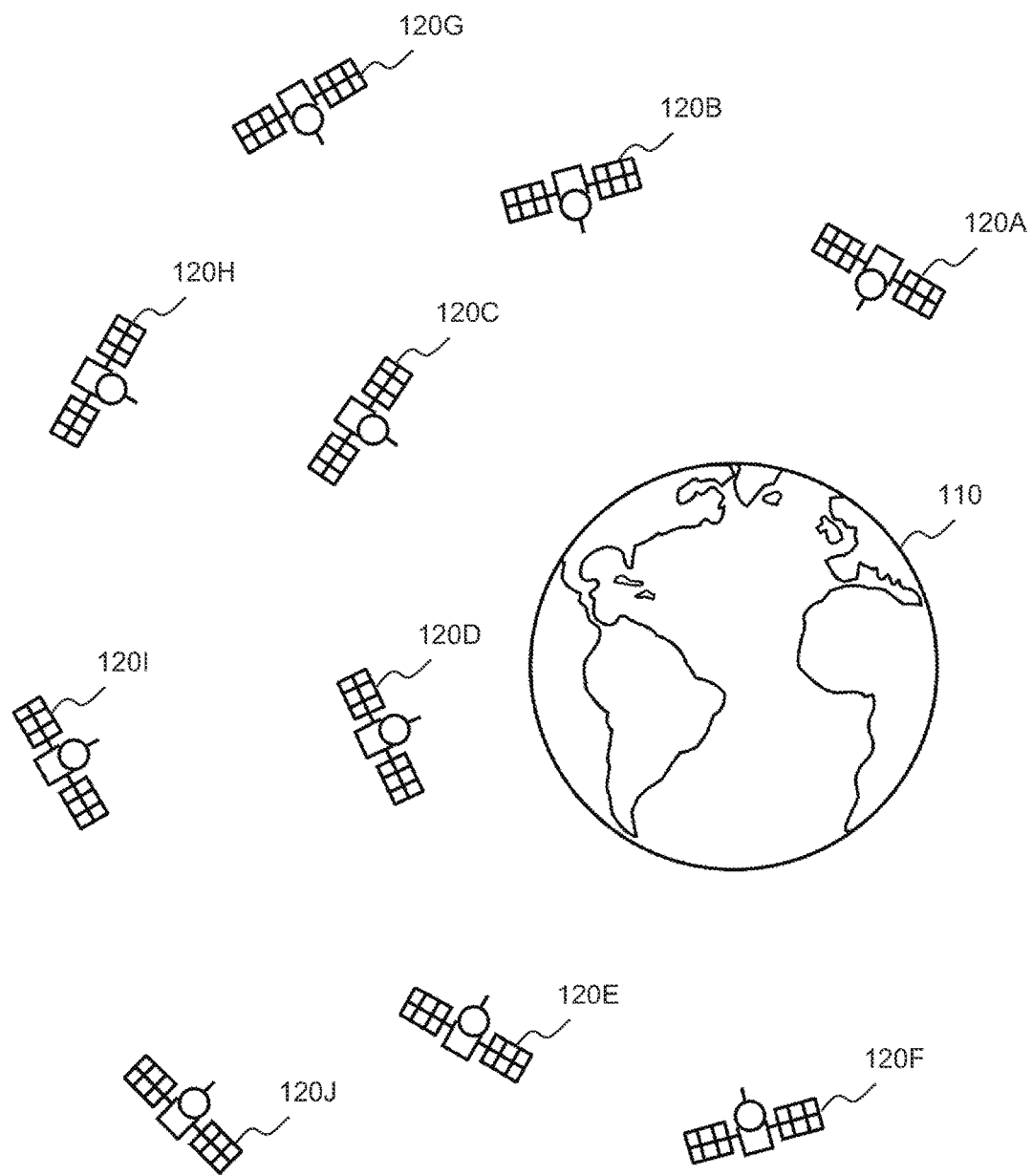
FIG. 1 illustrates a diagram of a plurality of low Earth orbit (LEO) satellites, a plurality of medium Earth orbit (MEO) satellites and a plurality of geosynchronous Earth orbit (GSO) satellites in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for enabling a receiver to determine its geographical location. The receiver can be at ground level (e.g., in a car) or in the air (e.g., onboard an aircraft). The receiver can determine its geographical location using light that is emitted from a plurality of satellites. The light can be generated from a light source on the satellites. For example, the light source on the satellites can include a light emitting diode (LED). Each of the satellites can be at a known position (e.g., according to an ephemeris). In one configuration, the light can be emitted from the light source on satellite in response to receiving a request from the receiver. Alternatively, the light can be emitted from the light source on the satellite according to a defined schedule or upon the satellite reaching a defined orbital position. The light source can emit the light according to a defined number of lumens, such that the light is visible to an optical telescope on the receiver. In some examples, the satellite can include a micro satellite (e.g., with a weight of between 2.2 and 110.2 lb) or a nano satellite (e.g., with a weight of between 2.2 and 20.2 lb). The receiver can send the request to the plurality of satellites, and in response, each of the satellites can emit the light for a period of time. For example, the light can be emitted from the light source on the satellite for a half second, ten minutes, etc. In one example, a light pulse (i.e., a flash of light or a series of light flashes) can be emitted from the satellite.

The receiver can detect the light that is emitted from each of the satellites. For example, the receiver can detect the light using the optical telescope. An angle between the receiver and each pair of satellites within the plurality of satellites can be measured. The receiver can measure the angles using the light that is emitted from each of the satellites. A pseudo range from the receiver to each of the satellites can be determined using the angle between the receiver and each pair of satellites. The receiver can determine its geographical location using the pseudo range to each of the satellites. In one example, the receiver can determine its position when detecting light from at least three separate satellites.

Previous optical-based navigation solutions have involved measuring a natural amount of light emitted from satellites or other space debris (e.g., spent booster tanks) with known locations. In other words, the satellites and/or the space debris that are being illuminated by the sun can be detected by the receiver's optical telescope on Earth. The receiver can use the detections of light along with a position algorithm in order to determine the current geographical location. However, these previous optical-based navigation solutions are inhibited by whether the sun is sufficiently illuminating the space objects. Whether the space objects are visible to the receiver can depend on how much light is being scattered from the space objects, and whether the space objects are bright enough to be seen against the background of the sky (and through the atmosphere). For example, the receiver may be attempting to perform navigation at noon, but the sun may be lighting up the sky, and as a result, the light reflected off of the space objects may be difficult to detect against the background of the sky.

In the previous optical-based navigation solutions, if a space object is in the Earth's umbra (or shadow), there is substantially no light being illuminated from the space object, and therefore, the space object cannot be detected by the optical telescope on the receiver. So based on the time of day, these space objects can be illuminating an insufficient amount of light to be used as a navigation aid. Another drawback of the previous optical-based navigation solutions is that low luminosity from the space objects makes detection of the light harder when the receiver is on the ground. When the receiver is lower in the atmosphere, these space objects are more difficult to detect (particularly during the daytime). Harsh weather conditions can also make detection of these space objects more difficult.

With the present technology described herein, controllable (e.g., aspects including, but not limited to, on/off, frequency, pulse/continuous, time, intensity, etc.) light generated and emitted from the satellites can be viewed more easily by the receiver on the Earth (either on the ground or in the air). These light-emitting satellites can be easier to detect by the receiver irrespective of poor weather conditions or the amount of atmosphere the light has to travel through to reach the receiver. Since LEO satellites and MEO satellites can be difficult to see during the daytime, augmenting these satellites with a controllable optical beacon can increase their detectability to the receiver. As a result, the receiver can more effectively use the detected light when determining its geographical location.

FIG. 1 illustrates a constellation of satellites 120A-J that orbit an Earth 110. The satellites 120A-J can include low Earth orbit (LEO) satellites, medium Earth orbit (MEO) satellites, high Earth orbit (HEO) satellites or geosynchronous Earth orbit (GSO) satellites. The satellites 120A-J can include cube satellites (CUBESATs), pico-satellites, nano-satellites, or micro-satellites, wherein the CUBESATs weigh less than 5 kilograms.

LEO can generally be defined as an orbit within the locus extending from the Earth's surface 110 up to an altitude of approximately 2,000 kilometers (km). MEO can be a region of space around the Earth above the LEO (altitude of approximately 2,000 km or 1,243 miles (mi)) and below a geostationary orbit (altitude of 35,786 km or 22,236 mi). The geostationary orbit can imply zero inclination. The geostationary orbit can have a period approximately equal to the Earth's rotational period and an orbital eccentricity of approximately zero. The geosynchronous orbit, also known as the geosynchronous Earth orbit (GSO) can imply an approximately 24-hour period, but does not imply zero eccentricity or zero inclination.

Figure 2:
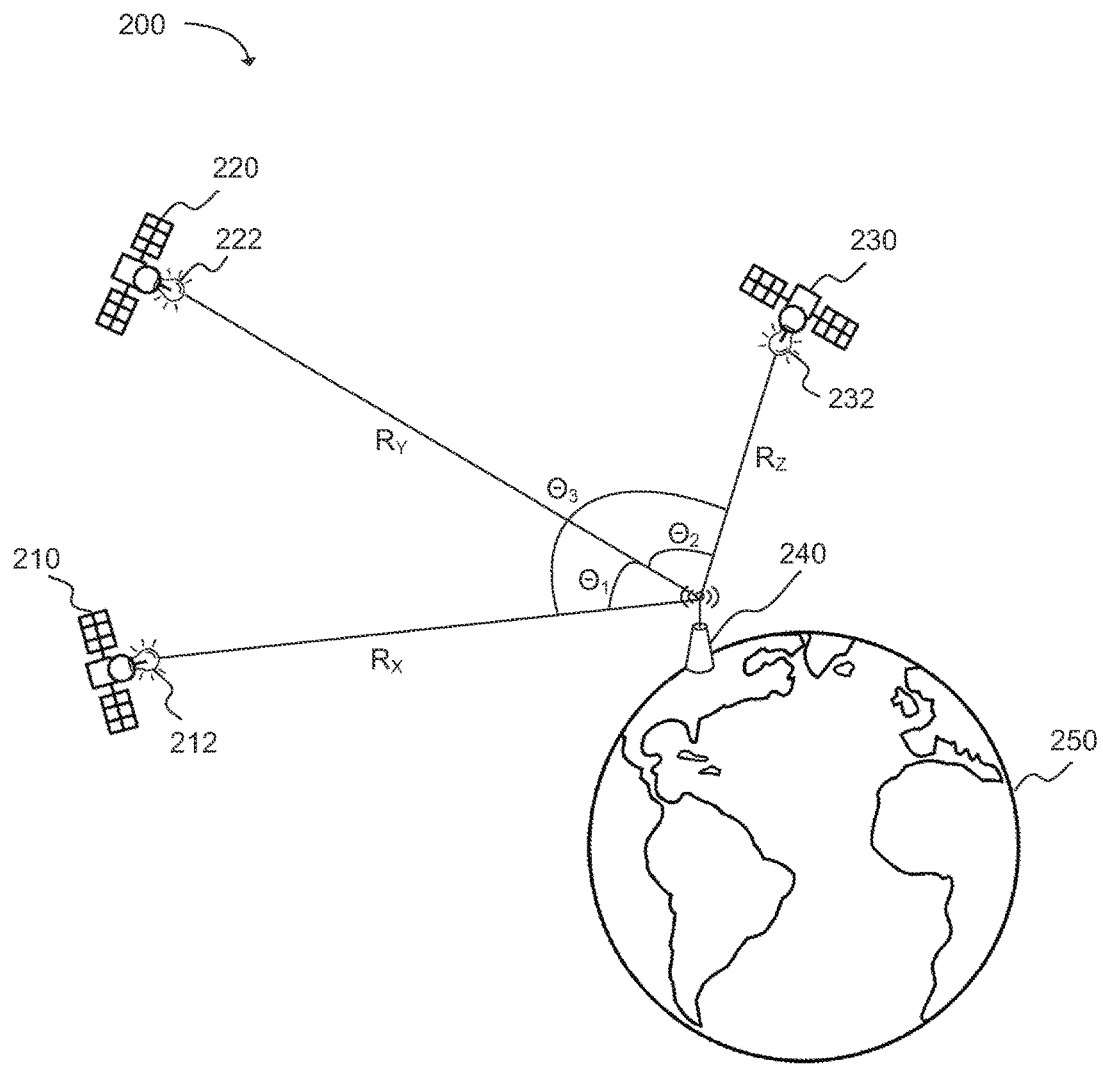
FIG. 2 illustrates a system for enabling a receiver to determine its geographical location using light emitted from a plurality of satellites in accordance with an example.

FIG. 2 illustrates an exemplary system 200 for enabling a receiver 240 to determine its geographical location using light generated and emitted from a plurality of satellites 210, 220 and 230. The receiver 240 can be on the Earth 250 at ground level (e.g., in a ground personnel vehicle) or in the air (e.g., onboard an aircraft or a missile). In one example, the receiver 240 can be included in handheld equipment. The receiver 240 can take passive optical measurements of the light that is emitted from the satellites 210, 220 and 230. The receiver 240 can use the optical measurements in a position algorithm in order to determine the geographical location. As described in further detail below, the satellites 210, 220 and 230 can have an optical augmentation (e.g., LEDs on the satellites 210, 220 and 230 that can be triggered to flash upon receiving a signal from the receiver 240) that, when detected by the receiver 240, provides the receiver 240 with a space-based inertial navigation solution.

As a result, the receiver 240 can obtain global positioning system (GPS)-like navigation precision without the risk of using jammable signals. In addition, the receiver 240 can determine its geographical location without using satellites that transmit GPS signals. As others improve their ability to deny GPS signals, the present technology provides an alternative navigation approach that does not use GPS signals. The present technology described herein has low observability to unauthorized users, and therefore, has a reduced likelihood of being compromised or illegitimately used by others, such as an adversary.

The satellites 210, 220 and 230 are optical reference points that enable the receiver 240 to calculate its position. The satellites 210, 220 and 230 can be located at known positions. For example, the positions for each of the satellites 210, 220 and 230 can be previously determined using an ephemeris. The satellites 210, 220 and 230 can include cube satellites (CUBESATs), pico satellites, nano satellites, or micro satellites, wherein the CUBESAT weighs less than 5 kilograms. In addition, the satellites 210, 220 and 230 can include low earth orbit (LEO) satellites, medium earth orbit (MEO) satellites, or geosynchronous (GSO) satellites. Each of the satellites 210, 220 and 230 can include an optical source or a light source 212, 222 and 232, respectively. Each of the light sources (e.g., a light, a beacon) can generate light that is detected by the receiver 240. The satellites 210, 220 and 230 can form an optical-based satellite constellation that provides a GPS-like navigation solution for the receiver 240, but do not actually transmit GPS signals. The satellites 210, 220 and 230 can provide an alternative navigation solution when a GPS constellation is denied (e.g., when GPS is being jammed or spoofed) or when GPS is not available.

The satellites 210, 220 and 230 can be relatively easy and quick to launch (e.g., due to the satellite's relatively low weight and minimal complexity). An optical-based satellite constellation can be launched to provide navigation coverage for a particular area of operation, such as any specific, defined geographic location on Earth. The optical-based satellite constellation can provide adequate navigation coverage for receivers in such location, but for example, this particular optical-based satellite constellation may be inoperative for receivers located in other geographic locations. In other words, the satellites 210, 220 and 230 may provide navigation solutions within a limited area in some cases, but in other cases, the satellites 210, 220 and 230 may provide navigation solutions for a more extensive area.

In one configuration, the receiver 240 can initiate a process for determining its current geographical location. The receiver 240 can send a signal to the satellite 210 requesting that the satellite 210 emit light, such as for a defined time period for detection of the light at the receiver 240. In other words, the satellite 210 can be interrogated from the ground. In one example, the receiver 240 can send a wide beam optical signal to the satellite 210, which indicates the receiver's request for the satellite 210 to emit the light for the defined time period. The receiver 240 can be previously programmed, such that the receiver 240 is capable of communicating with the satellite 240. In response to receiving the signal from the receiver 240, the satellite 210 can emit the light from the light source 212 on the satellite 210. The light can be emitted from the light source 212 on the satellite 210 as a flash or pulse, or alternatively, the light can be emitted from the light source 212 on the satellite 210 for a longer duration. For example, the satellite 210 can emit the light for a few seconds, a few minutes, or a few hours. In an alternative example, the receiver 240 can flash a laser beam, and in response, the light source 212 on the satellite 210 can emit the light for the defined time period. In one example, the light source 212 on the satellite 210 can be a light emitting diode (LED). The satellite 210 can include a power source (e.g., a battery, a solar panel) that powers the light source 212. In an alternative example, the satellite 210 can emit an infrared laser burst (as opposed to viewable light) to enable the receiver 240 to determine its position. Indeed, the light can comprise various types, frequencies, intensities, etc., can be illuminated or activated for different amounts of time, etc. These aspects can be specifically controlled and initiated as desired or needed.

Since the satellite 210 can flash the light in response to receiving the signal from the receiver 240, the satellite 210 is unlikely to be jammed by an adverse party. In contrast, GPS signals from GPS satellites can be more easily jammed by adverse parties. Since adverse parties are unlikely to be able to communicate with the satellite 210, the adverse parties are unlikely to use the satellite 210 for navigation purposes.

In one example, the light that is transmitted from the satellite 210 does not include additional information for navigation purposes. In other words, the beam of light (or burst of light) emitted from the satellite 210 may not include other types of information for enabling the receiver 240 to determine its position. Therefore, unlike GPS satellites, the satellite 210 can be configured not to broadcast radio frequency (RF) signals. Rather, the satellite 210 can flash a beam of light based on some type of trigger (e.g., a signal from the receiver 240 or according to a preprogrammed function), and multiple light beams can be detected by the receiver 240 for position determination.

In an alternative configuration, the satellite 210 can automatically emit the light (i.e., without receiving a trigger from the receiver 240). For example, the light source 212 on the satellite 210 can automatically emit the light according to a defined schedule. In another example, the light source 212 on the satellite 210 can turn on the light when the satellite 210 reaches a defined orbital position. The defined orbital position can be useful in providing navigation coverage to the receiver 240 in a particular region. When the receiver 240 leaves the region, the light source 212 on the satellite 210 can turn off the light. Therefore, during the period of time in which the receiver 240 is in the region, the receiver 240 can be provided with navigation coverage from the satellite 210. In yet another example, the light source 212 on the satellite 210 can turn on the light upon the satellite 210 reaching a first defined orbital position, and then turn off the light upon the satellite 210 reaching a second defined orbital position. In other words, the light source 212 on the satellite 210 can be preprogrammed to turn on at a first time and then turn off at a second time. In one configuration, the light source 212 on the satellite 210 can be perpetually left on to aid the receiver 240 in determining its location. However, such a configuration can use an inordinate amount of power (because the light is constantly on). In addition, constantly leaving the light on can result in adverse parties more easily using the satellite 210 for navigation purposes.

The receiver 240 can detect the light that is emitted from the satellite 210 using an optical telescope on the receiver 240. In one example, the optical telescope can be a visible band optical telescope. Alternatively, the receiver 240 can use an infrared camera to detect the light that is emitted from the satellite 210. In addition, the receiver 240 can detect light from the satellite 220, as well as the satellite 230. In other words, the receiver 240 can detect light that is emitted from the light source 222 on the satellite 220. In addition, the receiver 240 can detect light that is emitted from the light source 232 on the satellite 230. Therefore, in the example shown in FIG. 2, the receiver 240 can detect three beams of light from three separate satellites, respectively.

The receiver 240 can provide measurements of the detected light into a processing algorithm in order to determine the receiver's position. For example, the receiver 240 can use the detected light in order to measure an angle between the receiver 240 and each pair of satellites within the group of satellites 210, 220 and 230 that are emitting the light. For example, the receiver 240 can measure an angle (i.e., $\Theta_1$) between the satellite 210 and the satellite 220 using the detected light from the satellite 210 and the satellite 220, respectively. The receiver 240 can measure an angle (i.e., $\Theta_2$) between the satellite 220 and the satellite 230 using the detected light from the satellite 220 and the satellite 230, respectively. In addition, the receiver 240 can measure an angle (i.e., $\Theta_3$) between the satellite 210 and the satellite 230 using the detected light from the satellite 210 and the satellite 230, respectively. Therefore, the receiver 240 can measure $\Theta_1$, $\Theta_2$, and $\Theta_3$, which can represent the relative positions for each of the satellites 210, 220 and 230 with respect to each other and the receiver 240.

The receiver 240 can determine a pseudo range from the receiver 240 to each of the satellites 210, 220 and 230 using the angle between the receiver 240 and each pair of satellites. For example, the receiver 240 can determine a pseudo range ($R_x$) between the receiver 240 and the satellite 210. The receiver can determine a pseudo range ($R_y$) between the receiver 240 and the satellite 220. The receiver 240 can determine a pseudo range ($R_z$) between the receiver 240 and the satellite 230.

The receiver 240 can determine its own geographical location on the Earth 250 using the pseudo range between the receiver 240 and each of the satellites 210, 220 and 230 (i.e., $R_x$, $R_y$, and $R_z$). Since the satellites 210, 220 and 230 do not rely on illumination from the sun, but rather emit light using the light sources 212, 222 and 232, the satellites 210, 220 and 230 can be easily detected during the day. As a result, the receiver 240 can detect the light using the optical telescope and accurately measure the appropriate angles between the satellites 210, 220 and 230.

In one configuration, the receiver 240 can determine its own geographical location on the Earth 250 using four separate satellites (as opposed to three separate satellites). If there were four satellites (e.g., S1, S2, S3, and S4), the receiver 240 can detect four separate beams of light from each of the four satellites. The receiver 240 can measure a first angle between S1 and S2, a second angle between S1 and S3, a third angle between S1 and S4, a fourth angle between S2 and S3, a fifth angle between S2 and S4, and a sixth angle between S3 and S4. Using the angle measurements, pseudo ranges to each of the four satellites can be calculated. Using the four pseudo ranges, the receiver 240 can determine its geographical location.

Figure 3:
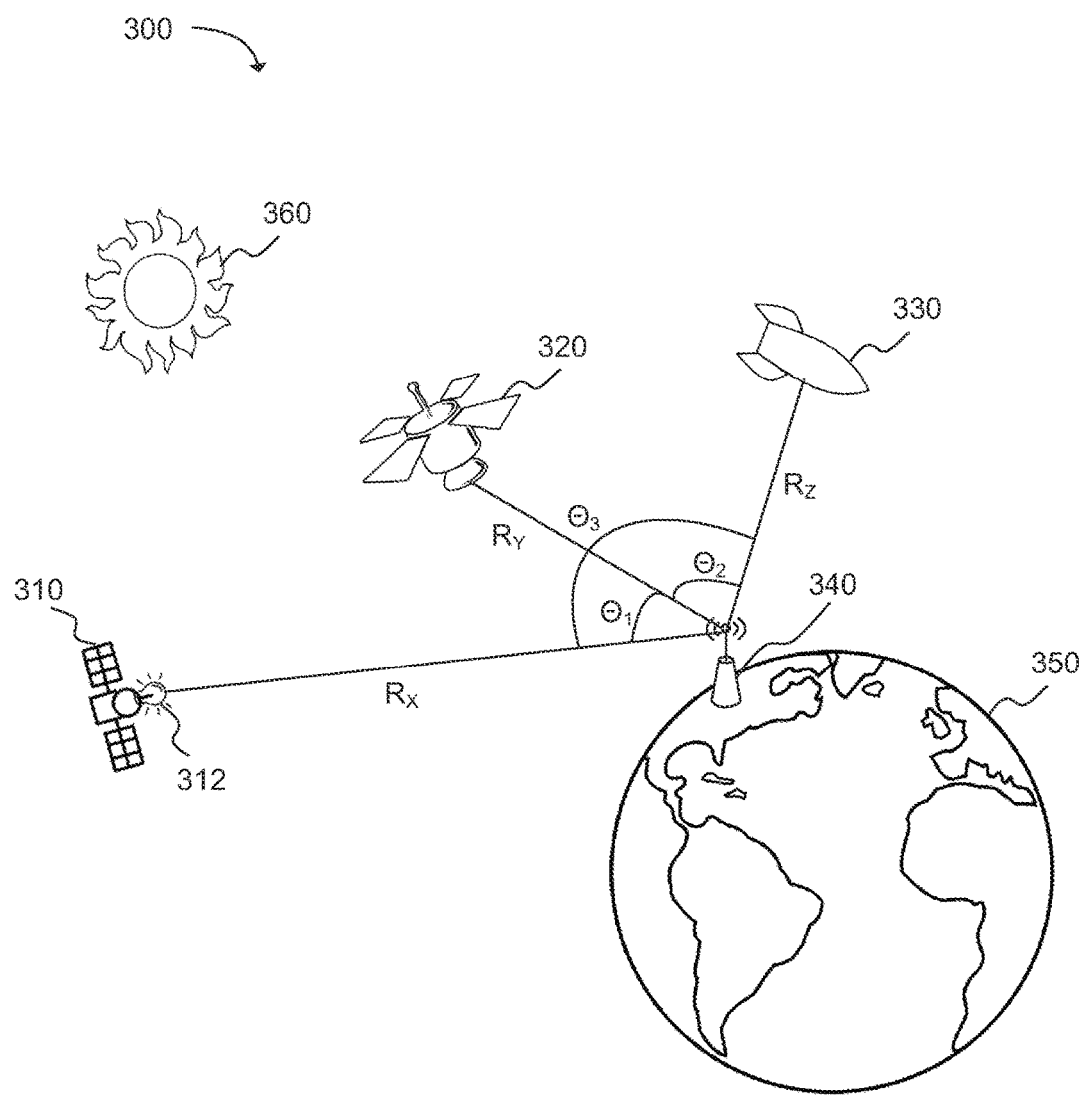
FIG. 3 illustrates a system for enabling a receiver to determine its geographical location using light emitted from a combination of satellites and space objects in accordance with an example.

FIG. 3 illustrates an exemplary system 300 for enabling a receiver 340 to determine its geographical location using light emitted from a combination of satellites and space objects. For example, the receiver 310 can detect light emitted from a light source 312 (or an optical source) on a satellite 310. In other words, the light can be generated by the light source 312 and then detected by the receiver 310. The receiver 310 can detect the light using an optical telescope. The satellite 310 can be at a known location (e.g., based on an ephemeris). If available, the receiver 310 can also detect light emitted from the space objects, such as a satellite 320 that does not have an optical augmentation (i.e., the satellite 320 does not have a light source) and a spent booster tank 330. The satellite 310, the satellite 320 and the spent booster tank 330 can orbit the Earth 350. In this example, the light emitted from the satellite 320 and the spent booster tank 330 can be from the sun 360. In other words, the sun's light can make the satellite 320 and the spent booster tank 330 visible to the receiver 340 on the Earth 350. However, when the sun's light is not shining on the satellite 320 and the spent booster tank 330, these space objects can be non-detectable to the receiver 340.

In general, space objects can include objects in space that orbit the Earth 350, but these objects do not have an optical augmentation. In other words, space objects do not generate their own light. The space objects do not have their own light source (e.g., an LED) for emitting light that can be detected at the receiver 340. Rather, the light that is reflected off of space objects is from the sun 360. Therefore, space objects can be more difficult to detect during the day (or when the space objects are under the Earth's umbra) by the receiver 340. Space objects that emit a reduced amount of light can be detected by receivers with more powerful optical telescopes (or cameras).

Other examples of space objects include communication satellites, GPS satellites, spent booster tanks from previous satellite launches, the International Space Station, space debris, weather satellites, etc. The North American Aerospace Defense Command (NORAD) tracks approximately 25,000 space objects. Approximately 5000 to 10,000 of these space objects can be spotted with optical systems (i.e., receivers with optical capabilities). In other words, each space object that is capable of being detected by the receiver 340 and useful for navigation purposes is at a known location.

In one configuration, the receiver 340 can determine its geographical location using the light that is emitted from the satellite 310, as well as light that is illuminated (via the sun 360) from the satellite 320 and the spent booster tank 330. In other words, the satellite 320 and the spent booster tank 330 can be visible to the receiver 340 via natural light that is being reflected off of the satellite 320 and the spent booster tank 330. The receiver 340 can send a signal to the satellite 310 requesting the satellite 310 to emit light for a defined period of time. In response, a light source 312 on the satellite 310 can emit the light for the defined period of time. The optical telescope on the receiver 340 can detect the light that is emitted from the satellite 310. In addition, the optical telescope on the receiver 340 can detect light that is reflected from the satellite 320 and the spent booster tank 330.

As previously described, the receiver 340 can provide measurements of the detected light into a processing algorithm in order to determine the receiver's position. For example, the receiver 340 can use the detected light in order to measure an angle between the receiver 340 and each object pair within a group of objects. In this case, the objects can include satellites with light sources (e.g., the satellite 310) or other types of space objects, such as satellites without light sources (e.g., the satellite 320) or space debris (e.g., the spent booster tank 330). For example, the receiver 340 can measure an angle (i.e., $\Theta_1$) between the satellite 310 and the satellite 320 using the detected light from the satellite 310 and the satellite 320, respectively. The receiver 340 can measure an angle (i.e., $\Theta_2$) between the satellite 320 and the spent booster tank 330 using the detected light from the satellite 320 and the spent booster tank 330, respectively. In addition, the 340 240 can measure an angle (i.e., $\Theta_3$) between the satellite 310 and the spent booster tank 330 using the detected light from the satellite 310 and the spent booster tank 330, respectively. The receiver 340 can determine a pseudo range ($R_x$) from the receiver 340 and the satellite 310. The receiver 340 can determine a pseudo range ($R_y$) from the receiver 340 and the satellite 320. In addition, the receiver 340 can determine a pseudo range ($R_z$) from the receiver 340 and the spent booster tank 330. The receiver 340 can determine its own geographical location on the Earth 350 using the calculated pseudo ranges (i.e., $R_x$, $R_y$, and $R_z$).

Figure 4:
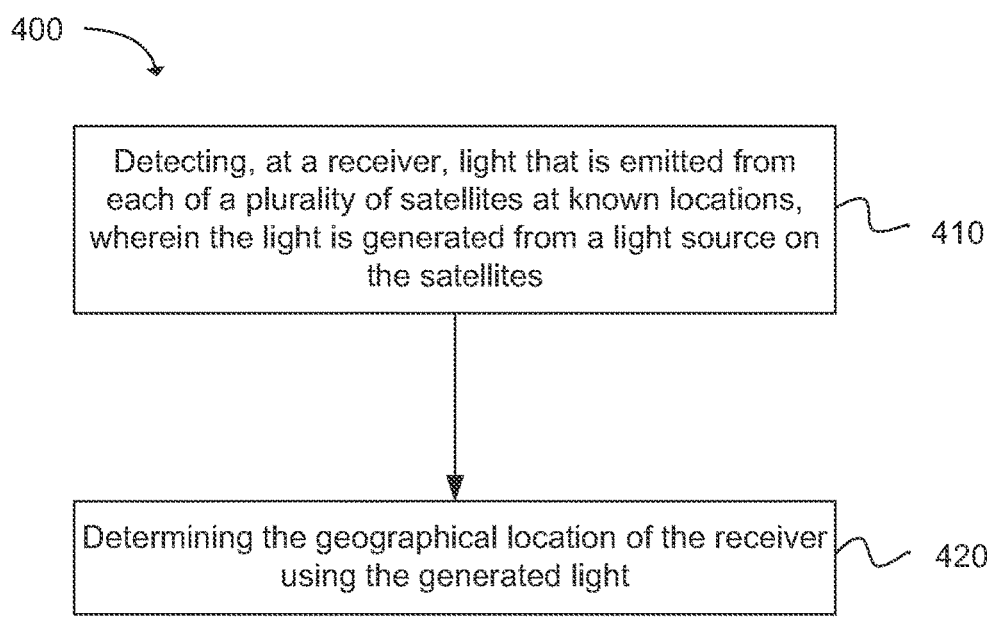
FIG. 4 depicts a flow chart of a method for determining a geographical location in accordance with an example.

FIG. 4 depicts a flow chart of a method 400 for determining a geographical location. The method 400 can be executed as instructions on a machine, where the instructions are included on at least one computer readable medium or one non-transitory machine readable storage medium. The method 400 can include the operation of detecting, at a receiver, light that is emitted from each of a plurality of satellites at known locations, wherein the light is generated from a light source on the satellites, as in block 410. The method 400 can include the operation of determining the geographical location of the receiver using the generated light, as in block 420.

In one aspect, the step of determining the geographical location of the receiver further comprises: measuring an angle between the receiver and each pair of satellites within the plurality of satellites using the light that is generated and emitted from the light source of each of the satellites; determining a pseudo range from the receiver to each of the satellites using the angle between the receiver and each pair of satellites; and utilizing the pseudo range between the receiver and each of the satellites to determine the geographical location.

In one example, the step of detecting the light that is emitted from each of the plurality of satellites is performed using an optical telescope on the receiver. In another example, the method 400 can include the operation of sending a signal, from the receiver, to each of the satellites to trigger an emission of the light from each of the satellites. In yet another example, each of the plurality of satellites can emit the light according to a defined schedule or upon reaching a defined orbital location, or other ways as would be apparent to those skilled in the art.

In one example, the satellites are selected from a group consisting of: cube satellites (CUBESATs), pico satellites, nano satellites, or micro satellites, wherein the CUBESAT weighs less than 5 kilograms. In another example, the satellites are selected from a group consisting of: low earth orbit (LEO) satellites, medium earth orbit (MEO) satellites, or geosynchronous (GSO) satellites. In yet another example, the step of determining the geographical location of the receiver further comprises using pseudo ranges between the receiver and at least three satellites. In addition, the receiver can be located at a ground level or above ground, such as onboard a moving object (e.g., missile, aircraft, etc.).

In one example, the step of determining the geographical location of the receiver further comprises: detecting light that is emitted from a space object with a known location; measuring an angle between the space object and each of the satellites with respect to the receiver; determining a pseudo range from the receiver to the space object using the measured angle; and utilizing the pseudo range from the receiver to the space object and pseudo ranges from the receiver to the plurality of satellites to determine the geographical location. In another example, the method 400 can include the operation of determining the known locations of the satellites using an ephemeris.

Figure 5:
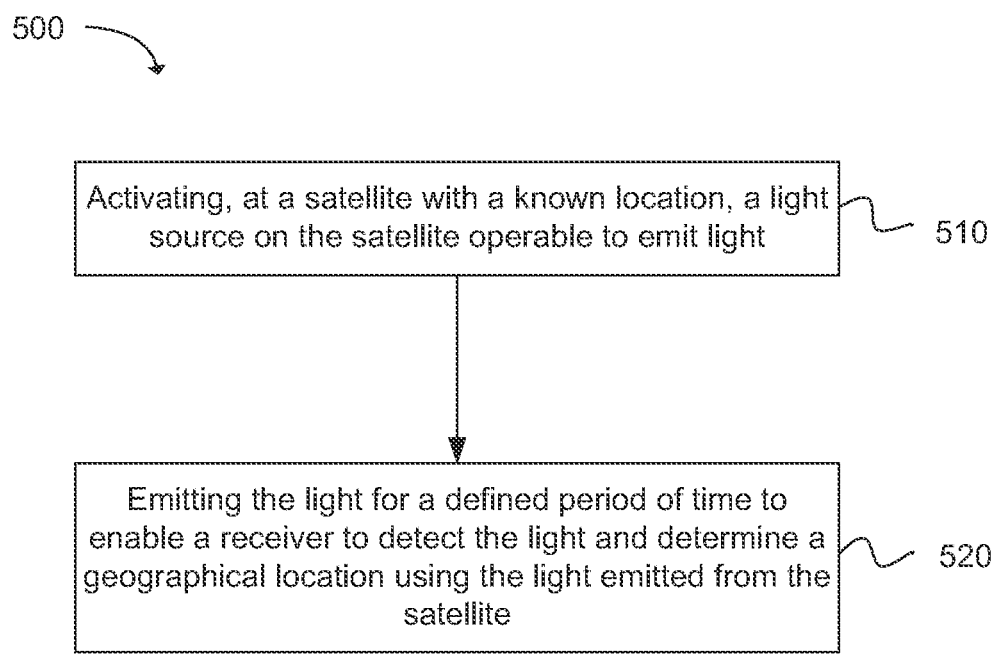
FIG. 5 depicts a flow chart of a method for facilitating position determination in accordance with an example.

FIG. 5 depicts a flow chart of a method 500 for facilitating position determination. The method can be executed as instructions on a machine, where the instructions are included on at least one computer readable medium or one non-transitory machine readable storage medium. The method 500 can include the operation of activating, at a satellite with a known location, a light source on the satellite operable to emit light; and emitting the light for a defined period of time to enable a receiver to detect the light and determine a geographical location using the light emitted from the satellite.

In one example, the step of activating the light source is in response to receiving a signal from the receiver, the signal requesting an emission of the light from the satellite. In another example, the step of activating the light source is in accordance with a defined schedule. In yet another example, the step of activating the light source occurs when the satellite reaches a defined orbital position. In one configuration, the light source on the satellite is a light emitting diode (LED). In addition, the method 500 can include the operation of emitting the light at a defined number of lumens to enable an optical telescope on the receiver to detect the light.

Figure 6:
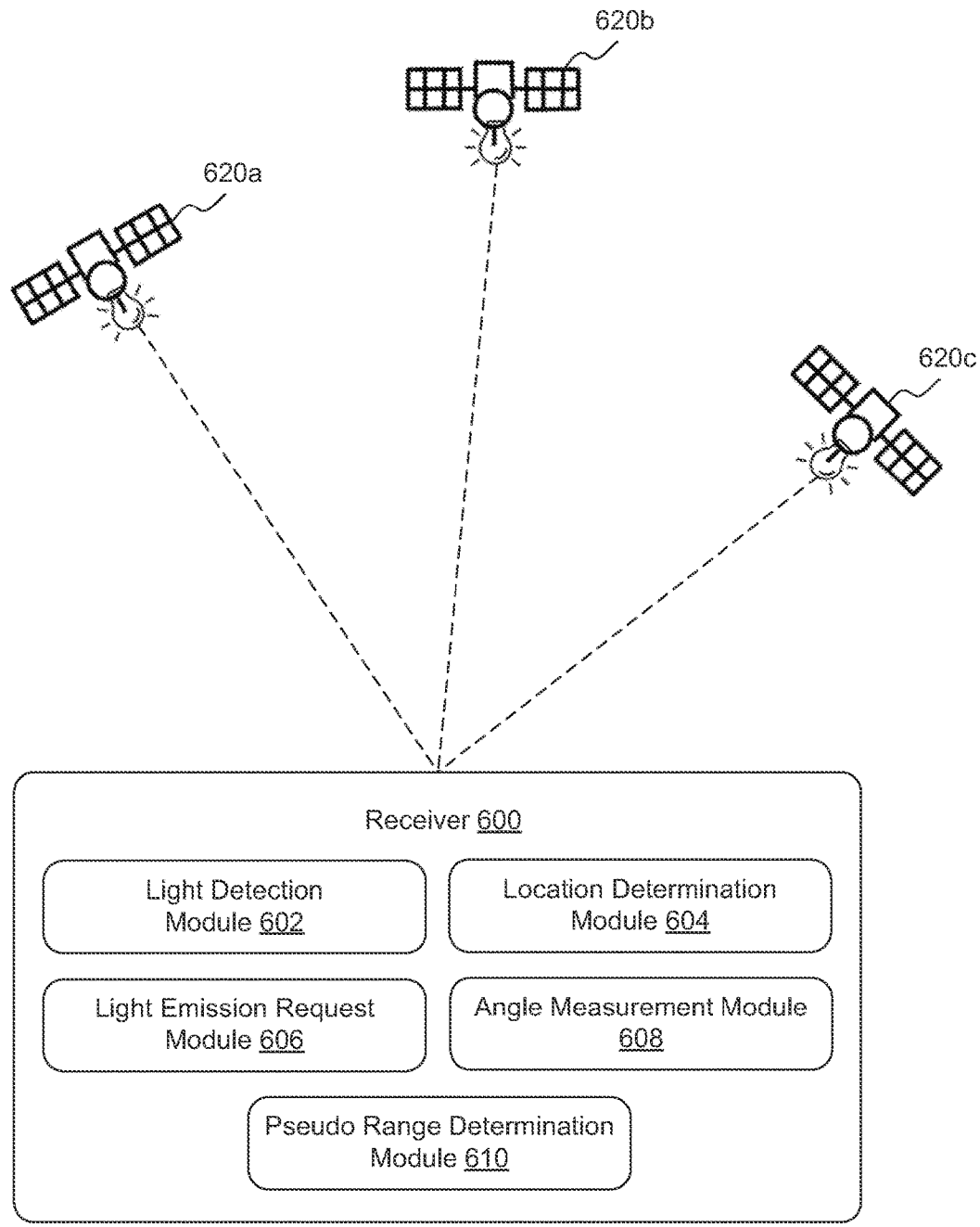
FIG. 6 depicts functionality of a receiver operable to determine a geographical location in accordance with an example.

FIG. 6 depicts functionality of a receiver 600 operable to determine a geographical location. The receiver 600 can include a light detection module 602 configured to detect light that is emitted from each of a plurality of satellites 620*a-c* at known locations, wherein the light is generated from a light source on the satellites 620*a-c*. The receiver 600 can include a location determination module 604 configured to determine the geographical location of the receiver 600 using the generated light.

In one configuration, the receiver 600 can include a light emission request module 606 configured to send a signal to each of a plurality of satellites 620*a-c* requesting an emission of the light from each of the satellites 620*a-c*, wherein the satellites 620*a-c* are at known locations. The receiver 600 can include an angle measurement module 608 configured to measure an angle between the receiver 600 and each pair of satellites within the plurality of satellites 620*a-c* using the light that is emitted from the light source of each of the satellites 620*a-c*. The receiver 600 can include a pseudo range determination module 610 configured to determine a pseudo range from the receiver 600 to each of the satellites 620*a-c* using the angle between the receiver 600 and each pair of satellites.

In one example, the location determination module 604 is further configured to utilize the pseudo range between the receiver 600 and each of the satellites 620*a-c* to determine the geographical location. In another example, the light detection module 602 is further configured to detect the light that is emitted from each of the plurality of satellites 620*a-c* via an optical telescope on the receiver 400. In yet another example, the light detection module 602 is further configured to detect the light that is emitted from at least three satellites, wherein the satellites emit the light according to a defined schedule or upon reaching a defined orbital location.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining a geographical location, the method comprising:
    detecting, at a receiver, light that is emitted from each of a plurality of satellites at known locations, wherein the light is generated from a light source on the satellites;
    determining the geographical location of the receiver using the generated light measuring an angle between the receiver and each pair of satellites within the plurality of satellites using the light that is emitted from the light source of each of the satellites;
    determining a pseudo range from the receiver to each of the satellites using the angle between the receiver and each pair of satellites; and
    utilizing the pseudo range between the receiver and each of the satellites to determine the geographical location.

2. The method of claim 1, wherein the step of detecting the light that is emitted from each of the plurality of satellites is performed using an optical telescope on the receiver.

3. The method of claim 1, further comprising sending a signal, from the receiver, to each of the satellites to trigger an emission of the light from each of the satellites.

4. The method of claim 1, wherein each of the plurality of satellites emit the light according to a defined schedule or upon reaching a defined orbital location.

5. The method of claim 1, wherein the satellites are selected from a group consisting of: cube satellites (CUBESATs), pico satellites, nano satellites, or micro satellites, wherein the CUBESAT weighs less than 5 kilograms.

6. The method of claim 1, wherein the satellites are selected from a group consisting of: low earth orbit (LEO) satellites, medium earth orbit (MEO) satellites, or geosynchronous (GSO) satellites.

7. The method of claim 1, wherein the step of determining the geographical location of the receiver further comprises using pseudo ranges between the receiver and at least three satellites.

8. The method of claim 1, wherein the receiver is located at a ground level or is onboard a moving aircraft.

9. The method of claim 1, wherein the step of determining the geographical location of the receiver further comprises:
    detecting light that is emitted from a space object with a known location;
    measuring an angle between the space object and each of the satellites with respect to the receiver;
    determining a pseudo range from the receiver to the space object using the measured angle; and
    utilizing the pseudo range from the receiver to the space object and pseudo ranges from the receiver to the plurality of satellites to determine the geographical location.

10. The method of claim 1, further comprising determining the known locations of the satellites using an ephemeris.

11. A method for facilitating position determination, the method comprising:
    activating, at a satellite with a known location, a light source on the satellite operable to emit light; and
    emitting the light for a defined period of time to enable a receiver to detect the light;
    operating the satellite with at least two additional objects in orbit comprising at least one of a satellite or a space object, wherein the satellite and the at least two additional objects comprise a group of objects;
    emitting the light from the satellite a sufficient time and in a sufficient manner so as to facilitate:
    measuring, by the receiver, an angle between the receiver, and each pair of objects within the group of objects using the light that is emitted from each of the objects;
    determining a pseudo range from the receiver to each of the satellite and the additional objects using the measured angles; and
    utilizing the pseudo ranges to determine the geographical location of the receiver.

12. The method of claim 11, wherein the step of activating the light source is in response to receiving a signal from the receiver, the signal requesting an emission of the light from the satellite.

13. The method of claim 11, wherein the step of activating the light source is in accordance with a defined schedule.

14. The method of claim 11, wherein the step of activating the light source occurs when the satellite reaches a defined orbital position.

15. The method of claim 11, wherein the light source on the satellite is a light emitting diode (LED).

16. The method of claim 11, further comprising emitting the light at a defined number of lumens to enable an optical telescope on the receiver to detect the light.

17. A receiver operable to determine a geographical location; the receiver comprising:
    a processor;
    a memory device including a data store to store a plurality of data and instructions that, when executed by the processor, cause the processor to execute:
    a light detection module configured to detect light that is emitted from each of a plurality of satellites at known locations, wherein the light is generated from a light source on the satellites;
    a location determination module configured to determine the geographical location of the receiver using the generated light;
    an angle measurement module configured to measure an angle between the receiver and each pair of satellites within the plurality of satellites using the light that is emitted from the light source of each of the satellites; and
    a pseudo range determination module configured to determine a pseudo range from the receiver to each of the satellites using the angle between the receiver and each pair of satellites within the plurality of satellites.

18. The receiver of claim 17, further comprising a light emission request module configured to send a signal to each of a plurality of satellites requesting an emission of the light from each of the satellites, wherein the satellites are at known locations.

19. The receiver of claim 17, wherein the location determination module is further configured to utilize the pseudo range between the receiver and each of the satellites to determine the geographical location.

20. The receiver of claim 17, wherein the light detection module is further configured to detect the light that is emitted from each of the plurality of satellites via an optical telescope on the receiver.

21. The receiver claim 17, wherein the light detection module is further configured to detect the light that is emitted from at least three satellites, wherein the satellites emit the light according to a defined schedule or upon reaching a defined orbital location.

22. A system for determining a geographical location, the system comprising:
   a plurality of satellites having known locations, each satellite comprising a light source operable to emit light;
   a receiver in communication with the plurality of satellites, the receiver comprising:
      a light detection module configured to detect the light that is emitted from each of the plurality of satellites;
      a location determination module operable to determine the geographical location of the receiver using the generated light;
      an angle measurement module configured to measure an angle between the receiver and each pair of satellites within the plurality of satellites using the light that is emitted from the light source of each of the satellites; and
      a pseudo range determination module configured to determine a pseudo range from the receiver to each of the satellites using the angle between the receiver and each pair of satellites within the plurality of satellites.

23. The system of claim 22, wherein the receiver further comprises an optical telescope operable to detect the light emitted from each of the plurality of satellites.

24. The system of claim 22, wherein the receiver further comprises a light emission request module operable to send a signal to each of the satellites to request or trigger an emission of the light from each of the satellites.

25. A system for determining a geographical location, the system comprising:
   a plurality of objects in orbit in space having known locations, at least one of the plurality of objects comprising a light source operable to emit light;
   a receiver in communication with the plurality of objects, the receiver comprising:
      a light detection module configured to detect the light that is emitted from the light source, and light from each of the plurality of objects;
      a location determination module operable to determine the geographical location of the receiver using the detected light;
      an angle measurement module configured to measure an angle between the receiver and each pair of objects within the plurality of objects using the light that is emitted from the light source and each of the objects; and
      a pseudo range determination module configured to determine a pseudo range from the receiver to each of the objects using the angle between the receiver and each pair of objects within the plurality of objects.

26. The system of claim 25, wherein at least one of the objects in the plurality of objects comprises a satellite, the light source being supported by the satellite.

27. The system of claim 25, wherein the plurality of objects comprises at least three objects, at least one being a space object having a known location.

28. The system of claim 25, wherein the plurality of objects comprises at least three objects selected from the group consisting of a plurality of satellites, a plurality of space objects, and any combination of these, at least one of the objects being in support of the light source.

29. The system of claim 25, wherein the light detection module of the receiver further comprises an optical telescope operable to detect the light emitted from each of the plurality of objects.

30. The system of claim 25, wherein the receiver further comprises a light emission request module operable to send a signal to each of the objects to request or trigger an emission of the light from the light source.

31. The system of claim 25, wherein the light source emits the light according to a defined schedule or upon reaching a defined orbital location.

* * * * *